United States Patent [19]
Gruner et al.

[11] 3,834,232

[45] Sept. 10, 1974

[54] ELECTROMAGNETIC FLOWMETER HAVING SELF-CLEANING ELECTRODES

[75] Inventors: Heinz Walter Gruner, Irondeqoit; Charles Gladstone Heisig, Rush, both of N.Y.

[73] Assignee: Sybron Corporation, Rochester, N.Y.

[22] Filed: Aug. 22, 1972

[21] Appl. No.: 282,854

[52] U.S. Cl. .......................................... 73/194 EM
[51] Int. Cl. .......................................... G01f 1/00
[58] Field of Search.... 73/194 EM, 181; 204/195 R; 324/30 B, 34 FL; 310/11

[56] References Cited
UNITED STATES PATENTS

| | | | |
|---|---|---|---|
| 2,800,016 | 7/1957 | Sturgeon | 73/194 EM |
| 2,939,070 | 5/1960 | Rosenthal | 324/30 B |
| 3,177,709 | 4/1965 | Fischer | 73/194 EM |
| 3,479,873 | 11/1969 | Hermanns | 73/194 EM |
| 3,529,591 | 9/1970 | Schvette | 73/194 EM X |

FOREIGN PATENTS OR APPLICATIONS

| | | | |
|---|---|---|---|
| 271,042 | 3/1971 | U.S.S.R. | 73/194 EM |
| 1,141,929 | 2/1969 | Great Britain | 73/194 EM |

*Primary Examiner*—Charles A. Ruehl
*Attorney, Agent, or Firm*—Theodore B. Roessel; Joseph C. MacKenzie; Charles C. Krawczyk

[57] ABSTRACT

Electromagnetic flowmeter electrodes having flat surfaces lying at angle of around 30° to the direction of flow. Each electrode surface consists of a relatively small conductive area surrounded by a relatively large insulating area.

10 Claims, 6 Drawing Figures

PATENTED SEP 10 1974 3,834,232

MEASURING OR CONTROL

ELECTROMAGNETIC FLOWMETER HAVING SELF-CLEANING ELECTRODES

FIELD OF INVENTION

Flowmeters wherein flow is measured as a function of the voltage generated in a conductive fluid flowing in a magnetic field, transverse to the direction of the field. The voltage is picked up by electrodes exposed to the fluent, but often the fluent is sewage or other electrode-fouling fluent, so conductive material deposits on the electrodes sometimes to the extent of forming a continuous path between electrodes which shunts the voltage, and in any event degrades the flow measurement being made.

DESCRIPTION OF THE PRIOR ART

Heretofore, it has been proposed to prevent fouling, or to clean electrodes in place, as by scraping, vibrating or otherwise acting on the electrode. The object of the present invention, however, is to obviate such expedients by providing an electrode configuration which is inherently non-fouling, in effect, or more precisely, substantially unaffected by fouling.

SUMMARY OF THE INVENTION

The foregoing object is achieved by making the electrodes surfaces inclined to the direction of flow. The flow strikes the surface at an angle of, for example, 30°. The turbulence at the surfaces does not favor deposit of materials and no element of fluent stays long enough at the electrode surfaces to deposit solids on the surfaces. The electrode therefore necessarily has a configuration having a leeside whereat fluent can stagnate and deposit solids. However, by making only a small part of the electrode surfaces conductive and the remaining parts of the surfaces non-conductive, and by locating the former so that the latter isolate the former from the leeside of the electrodes, fouling at the leeside does not affect the measurement of flow.

DESCRIPTION OF THE PREFERRED EMBODIMENTS

Figure 5:
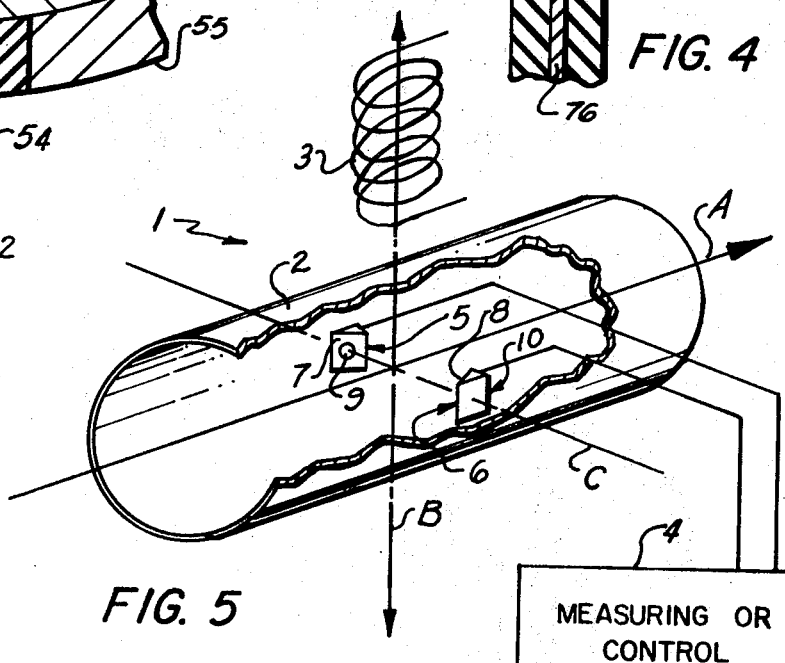
FIG. 5 is a schematic perspective view of the electromagnetic flowmeter according to the invention

Referring first to FIG. 5, reference numeral 1 generally denotes an electromagnetic flowmeter. The flowmeter 1 consists of a relatively short pipe 2, magnetic field producing means 3, measuring and/or control circuitry 4, and electrodes 5 and 6. Pipe 2 is adapted to be inserted in a pipe line (not shown) for the usual measuring or control purposes. The present invention, however, contemplates that the fluent in the pipe 2 will be sewage or the like, containing conductive solids which can deposit out and adhere to adjacent structures, such as the electrodes and the inner walls of pipe 2, at sufficiently low flow rates.

According to the invention, the electrodes 5 and 6 have respective flat surfaces 7 and 8, inclined at an angle of about 30 percent to the direction of the fluent in the pipe 2, such direction having shown by the arrow A. The direction of the magnetic field, due to the means 3 is shown by line B (which has opposed arrow heads to exemplify the usual practice of using an AC field). The electrodes are located on the line C which contains a diameter of pipe 2, since the maximum voltage is generated perpendicular to flow direction and field direction.

Surface 7 (and 8) and the electrode structure in general, is to be supposed to be electrically unconductive, except at 9 on surface 7 (and at the like place, not visible in the view of FIG. 5, on surface 8), where it is conductive, and to which conductive portion circuitry 4 is to be supposed to be electrically connected. With the configuration shown it is clear that flow in the direction A continually sweeps surface 7 (and 8) thereby preventing fouling of the insulating parts of the surface by conductive solids in the fluent in pipe 2. Experience shows that such fouling does occur at the lee sides of the electrodes (e.g., as at location 10), and that the deposited conductive material may extend from the lee side of electrode 6 continuously to the leeside of electrode 5, yet, with the electrodes of the present invention, the voltage generated between the electrodes is picked up as if no deposit existed. The angle of inclination to the flow is not particularly critical, since though 30° seems to be optimum, it may vary from 15° to 45° without degrading the measurement intolerably. It is self-evident that the essential requirements are that the surface 7 (and 8) has an area entirely surrounding and next adjacent the exposed surface portion of electrode 9 (and 6), and that about the entire extent of said area and surface portion lie at about the same angle to direction A.

Figure 1:
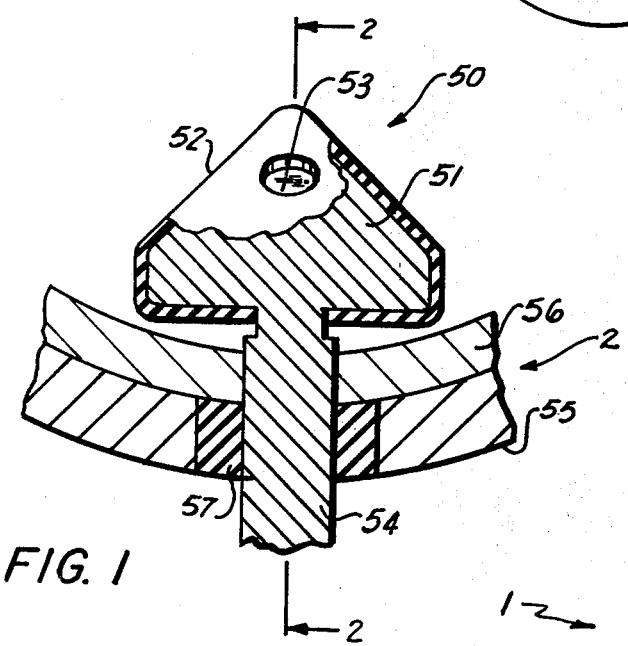
Figure 4:
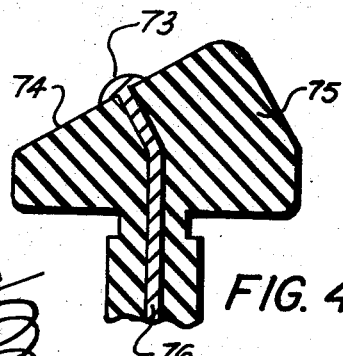

In FIG. 1, the electrode 5 is for the most part a solid piece 51 of metal of the configuration shown, with a coating or cladding 52 of vitreous enamel, or other electrical insulant. Coating 52 totally covers the piece 51 except for a small part thereof at 53, and the stem-like element 54. As shown, pipe 2 consists of a metallic wall portion 55 (usually, non-magnetic stainless steel) with a liner 56 (e.g., Teflon). Stem 54 is hermetically received in wall 55 and liner 56, an insulating washer 57 being provided to avoid electrical contact with wall 55.

Figure 2:
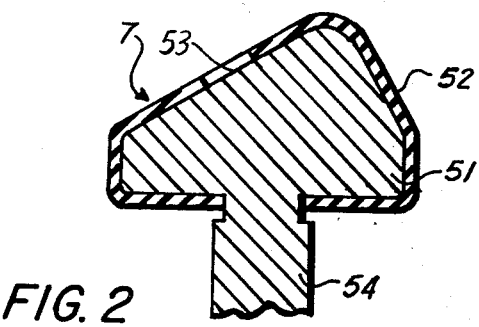
FIGS. 1 and 2 are sectional views of one form of an electrode according to the invention.
Figure 3:
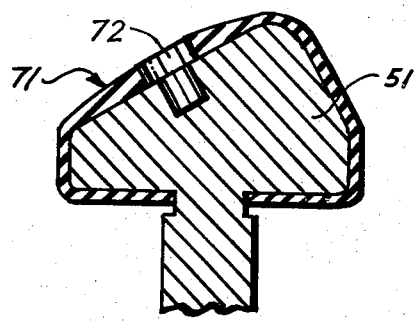
FIGS. 3 and 4 are views like FIG. 2, but of a second and third form of an electrode according to the invention
Figure 6:
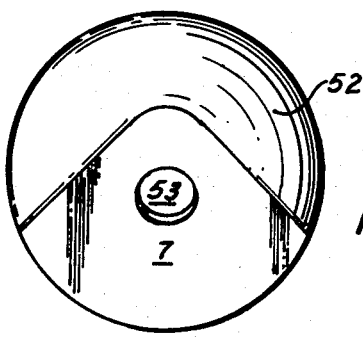
FIG. 6 is a plan view of the electrode shown in FIGS. 1 and 2.

As will be observed from FIG. 2, which is substantially a section on line 2—2 of FIG. 1, the conductive element of the electrode surface 7, i.e. part 53, is sunken. As will be seen from FIG. 3, the electrode may have a slightly convex surface 71, by virtue of making the insulation somewhat thick at the central part of the surface, and providing a sort of a bolt-like metallic filler 72 as part of piece 51. Again, the conductive part of the electrode surface may be in the form of a bolt-like element the head 73 of which is exposed on the surface 74 of a piece 75 of insulating material having the shape of metal piece 51, FIGS. 1 and 2, head 73 also having a conductive stem 76 for connecting it to circuitry 4.

While reference has been to fouling with conductive material, it is also desirable to keep the conductive part of flowmeter electrodes free of non-conductive fouling, another property of the present invention.

Having disclosed our invention in accordance with the statutes, we claim:

1. An electromagnetic flowmeter having a passage, said passage and the inner wall of said passage being constructed and arranged for having electrode-fouling fluent flowing through said passage, said passage having a pair of electrodes therein, said electrodes being mounted on said wall and on opposite sides of said passage from each other;

said flowmeter including magnetic means for creating a magnetic field in said passage and directed transversely of a line joining said electrodes, and of the direction of flow of said fluent;

each said electrode having an electrically conductive element projecting from said wall and into said passage, said element being covered by electrical insulation except at a surface portion thereof spaced from said wall and in said passage; said insulation having a surface area extending continuously around and next-adjacent said surface portion; said surface area and said surface portion each lying inclined to said direction at about the same angle throughout about the entire extent of said surface area and said surface portion.

2. The electromagnetic flowmeter of claim 1, wherein said element provides the body of said electrode, and has a surface area lying transverse to said direction like said surface portion thereof, said surface area of said insulation being provided as a coating coincident with said surface area of said element.

3. The electromagnetic flowmeter of claim 1, wherein said insulation provides the body of said electrode, and said element is an elongated electric conductor embedded in said insulation.

4. The electromagnetic flowmeter of claim 1, wherein said surface area and said surface portion are substantially flat.

5. The electromagnetic flowmeter of claim 1, wherein said surface area and said surface portion are substantially flat and one thereof is elevated above the other.

6. The electromagnetic flowmeter of claim 1, wherein said surface area and said surface portion overall define a surface which is convex toward said flow.

7. The electromagnetic flowmeter of claim 1, wherein said surface portion is substantially flush with the next adjacent boundary of said surface area.

8. The electromagnetic flowmeter of claim 7, wherein said surface portion is flat and said surface area is convex toward said flow.

9. In electromagnetically metering flow of liquid fluent flowing in a pipe wherein flow-induced voltages are detected by inserting an electrode into said fluent, and wherein said electrode is of the type having an electrically conductive surface surrounded by an electrically insulating surface, the periphery of which is everywhere spaced from the periphery of said electrically-conductive surface, the method of preventing electrically shorting said electrode, wherein such shorting would be due to deposition of conductive material carried by said fluent on the wall of said pipe and on said electrode, the method of cleaning said electrode comprising the step of 1. orienting said electrode so that said electrically insulating surface protrudes from said wall into said fluent such that said fluent flows against substantially every point of said electrically insulating surface.

10. The method of claim 9, also including the step of orienting said electrical conductive surface where said fluent simultaneously flows against substantially every point thereof.

* * * * *